United States Patent [19]

Hagihara

[11] Patent Number: 5,999,275
[45] Date of Patent: Dec. 7, 1999

[54] IMAGE READER

[75] Inventor: Hayato Hagihara, Tokyo, Japan

[73] Assignee: NEC Corporation, Japan

[21] Appl. No.: 08/968,170

[22] Filed: Nov. 12, 1997

[30] Foreign Application Priority Data

Nov. 13, 1996 [JP] Japan .................................. 8-301794

[51] Int. Cl.[6] .................................................. H04N 1/40
[52] U.S. Cl. ......................... 358/449; 382/286; 399/376
[58] Field of Search .................................. 358/448, 449, 358/451; 319/370, 376, 389; 382/286

[56] References Cited

U.S. PATENT DOCUMENTS

| 4,439,790 | 3/1984 | Yoshida | 358/256 |
| 4,554,592 | 11/1985 | Yoshida | 358/257 |
| 5,053,885 | 10/1991 | Telle | 358/451 |
| 5,323,473 | 6/1994 | Lau | 382/48 |
| 5,805,308 | 9/1998 | Tanaka et al. | 382/286 |

FOREIGN PATENT DOCUMENTS

| 661604 | 7/1995 | European Pat. Off. . |
| 3-93348 | 4/1991 | Japan . |

Primary Examiner—Thomas D. Lee
Attorney, Agent, or Firm—Ostrolenk, Faber, Gerb & Soffen, LLP

[57] ABSTRACT

An image reader to detect a width size and a length size of a manuscript without moving an optical image read device. A front end detector inputs binary coded data of a shading line of a front end of the manuscript, counts a number of black pixels in a lengthways direction of the shading line, calculates a width size of the front end of the manuscript from a counted value, and outputs a front end detection signal for representing that the front end of the manuscript passes through an image read line. A rear end detector stores initial density information of a surface color of a white plate mounted over the optical image read device into an internal register, the initial density information being read in an initial operation, inputs the front end detection signal from the front end detector, starts a counting using an internal counter, continuously compares density information of the image of the manuscript, contained in a first gamma-corrected digital signal output from a gamma corrector in an image read operation, with the initial density information stored in the internal register every predetermined time, stops the counting when both pieces of the density information are coincident with each other, and calculates a length from the front end to the rear end of the manuscript from a counted value of the counter.

4 Claims, 1 Drawing Sheet

FIGURE
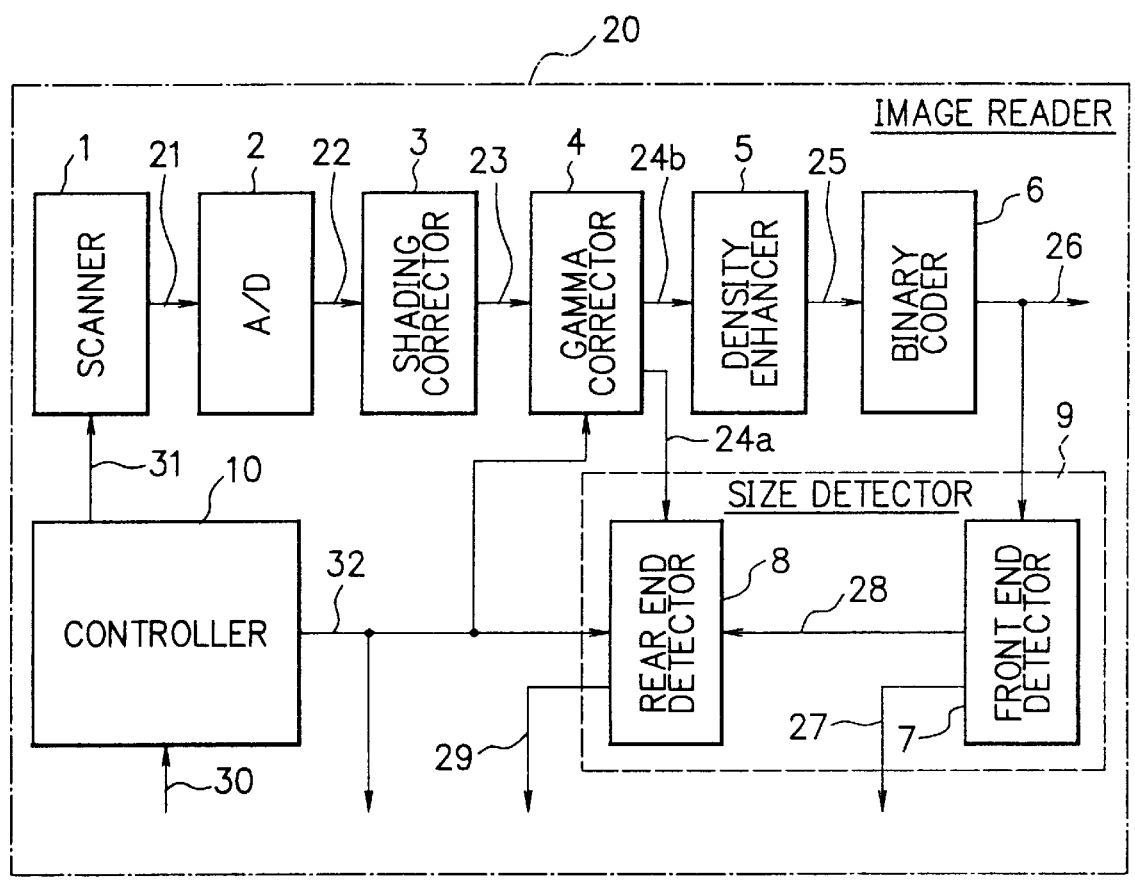

＃ IMAGE READER

BACKGROUND OF THE INVENTION

The present invention relates to an image reader for use as a facsimile, a digital copier, or the like which reads images of manuscripts conveyed consecutively by an automatic document feeder using a fixed image read line.

DESCRIPTION OF THE RELATED ART

In a conventional image reader for reading images of manuscripts conveyed in succession at a certain speed by an automatic document feeder using a fixed optical reading device, a manuscript size is detected using a plurality of optical sensors which are aligned widthways in fixed positions corresponding to predetermined width sizes of B5, A4 and the like with respect to the manuscript. That is, the positions of the optical sensors having detected the manuscript are automatically checked to judge the size of the manuscript such as B5, A4 or the like. However, in this image reader, the optical sensors are arranged widthways in the predetermined fixed positions corresponding to the predetermined width sizes of B5, A4 and the like, and as a result, only the predetermined fixed sizes such as B5, A4 and the like can be discriminated, failing to detect other manuscript sizes except the predetermined fixed sizes. In such an image reader, in order to permit discrimination of various manuscript sizes in addition to the predetermined fixed sizes, more optical sensors are required to be arranged widthways adjacent to one another. However, this causes cost increase.

In order to overcome the aforementioned problem, another image reader has been proposed, as disclosed in Japanese Patent Laid-Open Publication No. 3-93348. In this system, instead of using a plurality of optical sensors, recognition function of an image read device for reading an image of a manuscript is employed for detecting a width size of the manuscript. Just before reading the image of the manuscript, the image read device somewhat changes its position so as to detect the width size of the manuscript. That is, although the image read device is set to an image read line as an image read position of the manuscript when reading the image of the manuscript, after reading the image of the manuscript, the image read device is moved up a little in the upstream direction of the moving manuscript in order to prepare the detection of the width size of the manuscript and is stopped on a width size detection line. On this width size detection line, the image read device detects the width size of the conveyed next manuscript. After detecting the width size of the manuscript, the image read device is quickly returned down to the image read line in order to read the image of the manuscript before the front end of the manuscript reaches the image read line. The image read device then reads the image of the manuscript conveyed after the reach of the image read device on the image read line. In this image reader, as described above, the image read device is moved up and down repeatedly to detect the width sizes of the manuscripts and to read the images of the same one by one.

In this conventional image reader, the width size detection line on which the image read device detects the width size of the manuscript is set on the upper stream side of the moving manuscript than the image read line on which the image read device reads the image of the manuscript. The moving manuscript is covered over its rear surface, and a cover is made in black color in a part corresponding to the width size detection line. When the front end of the manuscript reaches the width size detection line, the outline of the front end of the manuscript can be readily detected in virtue of the contrast between the white color of the manuscript and the black color part of the cover behind the manuscript, measuring the width size of the front end of the manuscript. However, after detecting the width size of the front end of the manuscript, the image read device is moved down from the width size detection line to the image read line. Hence, the image read device cannot detect the rear end of the manuscript or the length of the manuscript.

In the above conventional image reader, the image read device for reading the image of the manuscript is also used to detect the width size of the manuscript. Further, the image read device is moved up from the image read line to the width size detection line in order to detect the width size of the manuscript after reading the image of the manuscript and then is quickly moved down from the width size detection line to the image read line in order to read the image of the manuscript after detecting the width size of the manuscript before the front end of the manuscript reaches the image read line. In such an image reader. the mechanism for moving the image read device is complicated with result of its maintenance difficulty. Moreover, with the complicated mechanism, the reliability of the image reader is deteriorated. Further, in this image reader, the length of the manuscript cannot be detected, and, if the detection of the length of the manuscript is required, another means is necessarily used. which is inconvenient and leads to cost increase.

SUMMARY OF THE INVENTION

It is therefore an object of the present invention to provide an image reader in view of the aforementioned disadvantages of the prior art, which is capable of detecting a width size and a length size of a manuscript without moving an optical image read device from an image read line.

In accordance with one aspect of the present invention, there is provided an image reader comprising an optical image read device fixed in a predetermined position for reading image data of a moving manuscript and front and rear ends of the manuscript to output information of the front and rear ends of the manuscript; and a size detector which inputs the information of the front and rear ends of the manuscript and calculates a width size of the front end of the manuscript and a length size between the front and rear ends of the manuscript from the information of the front and rear ends of the manuscript.

According to another aspect of the present invention, an image reader comprises an optical image read device fixed in a predetermined position for reading image data of a moving manuscript and front and rear ends of the manuscript to output information of the front and rear ends of the manuscript; and a size detector which inputs the information of the front and rear ends of the manuscript, calculates a width size of the manuscript from the information of the front end of the manuscript, calculates a required time from passing of the front end of the manuscript through the optical image read device to passing of the rear end of the manuscript through the optical image read device using the information of the front and rear ends of the manuscript, and calculates a length size between the front and rear ends of the manuscript from the calculated time and a moving speed of the manuscript.

Preferably, an image reader comprises an optical image read device fixed in a predetermined position on a moving path of a manuscript for reading image data of the manuscript moving at a predetermined speed to output an analog signal; an analog-digital converter for converting the analog signal input from the optical image read device into a digital signal; a shading corrector for electronically correcting dispersion of luminous intensity distribution caused by the optical image read device, the dispersion of the luminous intensity distribution being contained in the digital signal, to output a corrected digital signal; a gamma corrector for carrying out a density correction of the corrected digital signal depending on input pixel density by a gamma treatment to output first and second gamma-corrected digital signals; a density enhancer for carrying out a density correction of the second gamma-corrected digital signal on the basis of surrounding density around a point of density exhibited by the second gamma-corrected digital signal in the manuscript image to output an enhanced digital signal; a binary coder to input the enhanced digital signal from the density enhancer for comparing density represented by the enhanced digital signal with a predetermined threshold value to encode the enhanced digital signal into a binary code showing either a black or white color when the density of the enhanced digital signal is either larger or smaller than the predetermined threshold value to output binary coded data: a manuscript driver for conveying the manuscript along the moving path; a size detector for inputting initial density information of a surface color of a white plate mounted near the moving path, which is read by the optical image read device before the manuscript passes through an image read line, in an initial operation after a start of an image read operation of the manuscript and is output from the gamma corrector in the form of the first gamma-corrected digital signal; storing the initial density information in an internal register; inputting the binary coded data which are obtained by reading a shading line of the front end of the manuscript on the white plate by the optical image read device in the image read operation after the initial operation and are output from the binary coder; counting a number of black pixels in a lengthways direction of the shading line represented by the binary coded data; calculating a width size of the front end of the manuscript from a counted value of the counter; starting a counting using the internal counter; continuously comparing density information of the image of the manuscript, which is output from the gamma corrector in the image read operation, with the initial density information stored in the internal register every predetermined time; stopping the counting of the internal counter when both pieces of the density information are coincident with each other; and calculating a length from the front end to the rear end of the manuscript from a counted value of the counter to output length size data of the manuscript; and a controller for outputting a manuscript conveyance control signal to the manuscript driver and the optical image read device to control the manuscript driver so that the manuscript conveyance is carried out after the initial operation.

Further, an image reader preferably comprises an optical image read device fixed in a predetermined position on a moving path of a manuscript for reading image data of the manuscript moving at a predetermined speed to output an analog signal; an analog-digital converter for converting the analog signal input from the optical image read device into a digital signal; a shading corrector for electronically correcting dispersion of luminous intensity distribution caused by the optical image read device, the dispersion of the luminous intensity distribution being contained in the digital signal, to output a corrected digital signal; a gamma corrector for carrying out a density correction of the corrected digital signal depending on input pixel density by a gamma treatment to output first and second gamma-corrected digital signals; a density enhancer for carrying out a density correction of the second gamma-corrected digital signal on the basis of surrounding density around a point of density exhibited by the second gamma-corrected digital signal in the manuscript image to output an enhanced digital signal; a binary coder to input the enhanced digital signal from the density enhancer for comparing density represented by the enhanced digital signal with a predetermined threshold value to encode the enhanced digital signal into a binary code showing either a black or white color when the density of the enhanced digital signal is either larger or smaller than the predetermined threshold value to output binary coded data; a manuscript driver for conveying the manuscript along the moving path; a front end detector for inputting the binary coded data which are obtained by reading a shading line of the front end of the manuscript on the white plate by the optical image read device in an image read operation after an initial operation and are output from the binary coder; counting a number of black pixels in a lengthways direction of the shading line represented by the binary coded data; calculating a width size of the front end of the manuscript from a counted value of the counter to output width size data of the manuscript; and outputting a front end detection signal for representing that the front end of the manuscript passes through an image read line at a predetermined moving speed after the initial operation; a rear end detector for inputting initial density information of a surface color of a white plate mounted near the moving path, which is read by the optical image read device before the manuscript passes through the image read line, in the initial operation after a start of the image read operation of the manuscript and is output from the gamma corrector in the form of the first gamma-corrected digital signal; storing the initial density information in an internal register; inputting the front end detection signal from the front end detector after the initial operation; starting a counting using the internal counter; continuously comparing density information of the image of the manuscript, which is output from the gamma corrector in the image read operation, with the initial density information stored in the internal register every predetermined time; stopping the counting of the internal counter when both pieces of the density information are coincident with each other; and calculating a length from the front end to the rear end of the manuscript from a counted value of the counter to output length size data of the manuscript; and a controller for outputting a manuscript conveyance control signal to the manuscript driver and the optical image read device to control the manuscript driver so that the manuscript conveyance is carried out after the initial operation.

BRIEF DESCRIPTION OF THE DRAWING

The objects, features and advantages of the present invention will become more apparent from the consideration of the following detailed description, taken in conjunction with the accompanying drawing, in which:

The FIGURE is a block diagram of an image reader according to one embodiment of the present invention.

DESCRIPTION OF THE PREFERRED EMBODIMENTS

Referring now to the drawing, there is shown in the FIGURE an image reader according to one embodiment of the present invention.

As shown in the FIGURE, in the image reader 20, a scanner 1 as an optical image read device reads the light reflected from a manuscript surface to which light is irradiated from a light source using a photoelectric conversion element, and outputs an analog signal 21 to an analog-digital converter 2. The analog-digital converter 2 converts the analog signal 21 into a digital signal 22 to output the digital signal 22 to a shading corrector 3. The shading corrector 3 corrects influences of the digital signal 22 such as dispersion of luminous intensity distribution of the light source, and so on to output a corrected digital signal 23 to a gamma corrector 4. The gamma corrector 4 carries out a density correction of the corrected digital signal 23 depending on an input pixel density by a gamma treatment to output first and second gamma-corrected digital signals 24a and 24b. A density enhancer 5 receives the second gamma-corrected digital signal 24b from the gamma corrector 4 and implements a density correction of the second gamma-corrected digital signal 24b on the basis of the surrounding density around a point of density exhibited by the second gamma-corrected digital signal 24b in the image to output an enhanced digital signal 25 to a fixed threshold value binary coder 6 (called "binary coder 6" later). The binary coder 6 compares the density of the enhanced digital signal 25 with a predetermined threshold value and encodes the enhanced digital signal 25 into binary codes representing black and white colors to output binary coded data 26.

In an initial operation after a start of an image reading of a manuscript, the scanner 1 reads the surface of a white plate facing to the scanner 1 before the manuscript passes through an image read line, and the gamma corrector 4 outputs density information of a surface color of the white plate in the form of a first gamma-corrected digital signal 24a. After this initial operation, the scanner 1 reads a shading line of the front end of the manuscript on the surface of the white plate mounted near the moving path of the manuscript, and the binary coder 6 outputs binary coded data 26 representing this shading line. A size detector 9 inputs the first gamma-corrected digital signal 24a representing the initial density information of the surface color of the white plate from the gamma corrector 4 and stores this initial density information in an internal register. The size detector 9 also inputs the binary coded data 26 representing the shading line from the binary coder 6 and counts a number of black pixels in the lengthways direction of the shading line using an internal counter to calculate a size in the widthways direction of the front end of the manuscript to output width size data 27 of the manuscript. With outputting the width size data 27 of the manuscript, the size detector 9 starts a counting using an internal counter. while density information of the image of pattern data as the first gamma-corrected digital signal 24a output from the gamma corrector 4 is successively compared with the initial density information stored in the internal register every predetermined time during reading the image of the manuscript. When both pieces of the density information become equal, the size detector 9 finishes the counting and calculates a length from the front end to the rear end of the manuscript from the counted value of the counter to output length size data 29 of the manuscript. A controller 10 outputs a read start signal 31 to the scanner 1 in response to a start signal 30 fed from an operational section (not shown) and also outputs a manuscript conveyance command signal 32 for controlling manuscript drive means (not shown) to the manuscript drive means so that the manuscript conveyance may be conducted after the completion of the initial operation. The manuscript conveyance command signal 32 is also sent to the gamma corrector 4 and the size detector 9.

The size detector 9 includes a front end detector 7 and a rear end detector 8. The front end detector 7 including a counter inputs the binary coded data 26 representing the shading line of the front end of the manuscript read by the scanner 1 from the binary coder 6 and counts the number of the black pixels in the lengthways direction of the shading line to calculate the size in the widthways direction of the front end of the manuscript to output the width size data 27 of the manuscript. The front end detector 7 also detects a reach of the front end of the manuscript to the image read line to output a front end detection signal 28 to the rear end detector 8. The rear end detector 8 including a register and a counter stores the initial density information of the surface color of the white plate contained in the first gamma-corrected digital signal 24a in the register. Further, the rear end detector 8 inputs the front end detection signal 28 showing that the moving manuscript reaches the image read line from the front end detector 7 to start the counting using the counter, and successively compares the density information of the image of pattern data contained in the first gamma-corrected digital signal 24a output from the gamma corrector 4 with the initial density information stored in the register every predetermined time during reading the image of the manuscript. When both pieces of the density information coincide with each other, it is considered that the rear end of the manuscript is detected, and the size detector 9 finishes the counting and calculates the length from the front end to the rear end of the manuscript from the counted value of the counter to output the length size data 29 of the manuscript.

Next, the operation of the image reader described above will be described in detail with reference to the FIGURE.

The start of an image read operation of manuscripts is started by pushing a button, and the controller 10 inputs a start signal 30 to output a read start signal 31 to the scanner 1 and to start the operation of the image reader 10. Before starting an optical image read operation of the manuscript, first, a width and a length of the manuscript is detected by the scanner 1 of an optical image read device mounted on the same image read line. That is, as an initial operation of the image read operation, the scanner 1 positioned on the image read line is to read the surface color of the white plate mounted over the image read line during a certain time period. Specifically, the light for the image reading is irradiated from the scanner 1 to the surface of the white plate, and the scanner 1 reads the light reflected by the surface of the white plate using a photoelectric conversion element such as a CCD (charge-coupled device) or the like to output the detected light as an analog signal 21 to the analog-digital converter 2. The analog-digital converter 2 converts the analog signal 21 into an 8-bit digital signal 22 to output this digital signal 22 to the shading corrector 3. The shading corrector 3 corrects influences given to the digital signal 22 such as dispersion of luminous intensity distribution of the light source radiating the light to the white plate, dispersion of sensitivity of the photoelectric conversion element, and the like to output the corrected digital signal 23 to the gamma corrector 4. The gamma corrector 4 implements a density correction of the corrected digital signal 23 depending on an input pixel density exhibited by the corrected digital signal 23 by means of a gamma treatment to output the obtained initial density information of the surface color of the white plate in the form of the first gamma-corrected digital signal 24a to the rear end detector 8 of the size detector 9. The rear end detector 8 stores the initial density information contained in the first gamma-corrected digital signal 24a in its register until the image read operation of all manuscripts are finished.

After finishing the foregoing initial operation, the controller 10 outputs a manuscript conveyance command signal 32 to manuscript drive means (not shown), the gamma corrector 4 and the rear end detector 8. The manuscript conveyance is started, and the scanner 1 positioned on the image read line starts an image read operation of the conveyed manuscript. Before the front end of the moving manuscript reaches the image read line, the scanner 1 positioned on the image read line reads the surface of the white plate mounted over the image read line, and from the scanner 1 to the gamma corrector 4 operate in the same manner as in the aforementioned initial operation. However, after the start of the manuscript moving, the gamma corrector 4 and the rear end detector 8 input the manuscript conveyance command signal 32 from the controller 10, and the gamma corrector 4 outputs the second gamma-corrected digital signal 24b to the density enhancer 5 in addition to the sending of the first gamma-corrected digital signal 24a to the rear end detector 8. At this time, even when the gamma corrector 4 outputs the density information of the surface color of the white plate as the first gamma-corrected digital signal 24a to the rear end detector 8, the rear end detector 8 does not store this density information into its register.

When the light is irradiated from the scanner 1 to the moving manuscript, shading lines are caused in the front and rear ends of the manuscript because of a certain thickness of the manuscript. Now, when the front end of the moving manuscript reaches the image read line, the scanner 1 reads the shading line of the front end of the manuscript caused on the surface of the white plate. This shading line reading operation of the manuscript by the scanner 1 is the same as in the aforementioned initial operation, and from the scanner 1 to the gamma corrector 4 operate in the same manner as in the initial operation.

The gamma corrector 4 executes a density correction of the corrected digital signal 23 output from the shading corrector 3 depending on an input pixel density to output a second gamma-corrected digital signal 24b to the density enhancer 5, as described above. The density enhancer 5 carries out a density correction of the second gamma-corrected digital signal 24b on the basis of the surrounding density around a point of density shown by the second gamma-corrected digital signal 24b in the image to output an enhanced digital signal 25 to the binary coder 6. The binary coder 6 compares the density of the enhanced digital signal 25 with a predetermined threshold value. When the density of the enhanced digital signal 25 is larger than the predetermined threshold value, the binary coder 6 encodes the enhanced digital signal 25 into binary code data 26 showing the black color. On the other hand, when the density of the enhanced digital signal 25 is smaller than the predetermined threshold value, the binary coder 6 encodes the enhanced digital signal 25 into binary code data 26 showing the white color. The obtained binary code data 26 are output from the binary coder 6 to, for example, a transfer device to a sheet of paper in a copier, or a transmitter device to a target facsimile in a facsimile. As described above, in the image reader 20, the scanner 1 consecutively reads the image of the manuscript from the front end to the rear end, and a series of image signals of the manuscript as the binary coded image data 26 are output from the binary coder 6. In this embodiment, the operation of the scanner 1 to the binary coder 6 can be implemented in a conventional usual image processing.

The binary coder 6 also outputs the obtained binary coded data 26 to the front end detector 7 of the size detector 9. The front end detector 7 inputs the binary coded data 26 representing the shading line of the front end of the manuscript read by the scanner 1 from the binary coder 6, and the counter counts the number of the black pixels in the lengthways direction of the shading line. The front end detector 7 calculates the size in the widthways direction of the front end of the manuscript from the counted black pixel number to detect the width size of the manuscript, and outputs a width size data 27 of the manuscript. Further, the front end detector 7 detects that the front end of the manuscript passed through the image read line and outputs a front end detection signal 28 to the rear end detector 8. The rear end detector 8 inputs the front end detection signal 28 showing that the front end of the manuscript passed through the image read line. and starts a counting for measuring a moving time from the front end to the rear end of the manuscript using the counter.

The scanner 1 reads the image of the manuscript to output the read image as the analog signal 21 to the analog-digital converter to obtain the digital signal 22, and then the digital signal 22 is consecutively processed in the shading corrector 3, the gamma corrector 4, the density enhancer 5 and the binary coder 6 in the same manner as in the operation for picking up the shading line of the front end of the manuscript. The binary coder 6 then outputs the image signals of the manuscript as the binary coded data 26. In this way, a series of image signals of the manuscript as the binary coded image data 26 are output from the binary coder 6.

While the binary coder 6 outputs the image signals of the manuscript in the form of the binary coded data 26, the gamma corrector 4 continuously outputs the density information of the image color read by the scanner 1 as the first gamma-corrected digital signal 24a to the rear end detector 8 of the size detector 9. The rear end detector 8 samples the density information of the image color output from the gamma corrector at a predetermined time interval and compares the sampled density information of the image color with the initial density information of the surface color of the white plate, which is stored in the initial operation. In this embodiment, the surface color of the white plate is set to be whiter than that of the manuscript, and as a result of the comparison, both the colors do not coincide with each other as long as the reading of the image of the manuscript continues. That is, the uncoincided result between the two colors indicates the continuation of the reading of the image of the manuscript. The rear end detector 8 continuously compares the sampled density information of the image color with the initial density information of the surface color of the white plate as long as the gamma corrector 4 continuously outputs the density information of the image color as the first gamma-corrected digital signal 24a to the rear end detector 8.

Next, when the scanner 1 reads an image of the rear end of the manuscript after the reading of the image of the manuscript has almost finished, the operation is carried out as follows. That is, when the rear end of the moving manuscript reaches the image read line and passes through the same, the scanner 1 reads the surface color of the white plate, and the operations of the scanner 1 to the gamma corrector 4 are the same as those in the above-described initial operation. The gamma corrector 4 outputs the first gamma-corrected digital signal 24a containing the initial density information of the surface color of the white plate to the rear end detector 8. The rear end detector 8 then compares this initial density information contained in the first gamma-corrected digital signal 24a with the initial density information stored in its register to find a coincidence between the two pieces of density information and to detect that the rear end of the manuscript has passed through the image read line. Hence, the rear end detector 8 stops the counting and calculates the moving time of the manuscript, i.e, the required time of which from the front end to the rear end of the manuscript pass through the position of the scanner 1 from the counted value of the counter. By using the calculated time and the moving speed of the manuscript, the rear end detector 8 calculates a length from the front end to the rear end of the manuscript to output a length size data 29 of the manuscript.

As described above, the image read operation of one manuscript has been finished, and the image read operation of next manuscript will be carried out in the same way. The above-described initial operation is automatically executed every start operation of the image reader 20 by pushing the button. The width size data and the length size data of the manuscript are output every each manuscript, and these data are sent to, for example, to a sheet select controller for selecting various sizes of copy sheets of manuscripts in case of copier. As a result, a proper size of copy sheet for the manuscript whose reading has been finished can be automatically selected by the sheet select controller. In the foregoing description, although the initial operation is carried out every start operation of the manuscript reading by pushing the button, this initial operation may be carried out in an initial operation right after a power supply turn-on.

As described above, in an image reader according to the present invention, an optical image read device reads a shading image line of a front end of a manuscript to obtained an analog signal which is processed to binary coded data, and a front end detector inputs the binary coded data and counts a number of black pixels in a lengthways direction of the shading image line to detect a width size of the front end of the manuscript and detects that the front end of the manuscript reaches an image read line. A rear end detector stores an initial density information of a surface color of a white plate mounted over the optical image read device which read the surface color of the white plate in an initial operation into a register, inputs a front end detection signal from the front end detector, starts a counting using a counter, compares density information of a manuscript image read by the optical image read device with the initial density information stored in the register, stops the counting when both pieces of the density information become coincident with each other in the comparison to consider as a rear end of the manuscript is detected, and detects a length size from the front end to the rear end of the manuscript from a counted value counted by the counter, and a controller controls a manuscript drive means so that the manuscript may be conveyed after the finish of the initial operation. As described above, in the image reader of the present invention, there is no need to move the optical image read device from the image read line to a predetermined width size detection line where the width size of the manuscript is detected when reading the image of the manuscript, and the construction of the optical image read device is simplified with the result of an improved reliability. Further, in this image reader, not only the width size but also the length size of the manuscript can be detected.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. An image reader comprising:
   an optical image read device fixed in a predetermined position for reading image data of a moving manuscript and front and rear ends of the manuscript to output information of the front and rear ends of the manuscript; and
   a size detector which inputs the information of the front and rear ends of the manuscript and calculates a width size of the front end of the manuscript and a length size between the front and rear ends of the manuscript from the information of the front and rear ends of the manuscript, said size detector:
   inputting initial density information of a surface color of a white plate mounted near the moving path, which is read by the optical image read device before the manuscript passes through an image read line, in an initial operation after a start of an image read operation of the manuscript;
   storing the initial density information;
   inputting binary coded data which are obtained by reading a shading line of the front end of the manuscript on the white plate by the optical image read device in the image read operation after the initial operation;
   counting a number of black pixels in a lengthways direction of the shading line represented by the binary coded data to obtain a counted value; and
   calculating a width size of the front end of the manuscript from the counted value.

2. An image reader comprising:
   an optical image read device fixed in a predetermined position for reading image data of a moving manuscript and front and rear ends of the manuscript to output information of the front and rear ends of the manuscript; and
   a size detector which inputs the information of the front and rear ends of the manuscript, calculates a width size of the manuscript from the information of the front end of the manuscript, calculates a required time from passing of the front end of the manuscript through the optical image read device to passing of the rear end of the manuscript through the optical image read device using the information of the front and rear ends of the manuscript, and calculates a length size between the front and rear ends of the manuscript from the calculated time and a moving speed of the manuscript, said size detector:
   inputting initial density information of a surface color of a white plate mounted near the moving path, which is read by the optical image read device before the manuscript passes through an image read line, in an initial operation after a start of an image read operation of the manuscript;
   storing the initial density information;
   inputting binary coded data which are obtained by reading a shading line of the front end of the manuscript on the white Plate by the optical image read device in the image read operation after the initial operation;
   counting a number of black pixels in a lengthways direction of the shading line represented by the binary coded data to obtain a counted value; and
   calculating a width size of the front end of the manuscript from the counted value.

3. An image reader comprising:
   an optical image read device fixed in a predetermined position on a moving path of a manuscript for reading image data of the manuscript moving at a predetermined speed to output an analog signal;
   an analog-digital converter for converting the analog signal input from the optical image read device into a digital signal;

a shading corrector for electronically correcting dispersion of luminous intensity distribution caused by the optical image read device, the dispersion of the luminous intensity distribution being contained in the digital signal, to output a corrected digital signal;

a gamma corrector for carrying out a density correction of the corrected digital signal depending on input pixel density by a gamma treatment to output first and second gamma-corrected digital signals;

a density enhancer for carrying out a density correction of the second gamma-corrected digital signal on the basis of surrounding density around a point of density exhibited by the second gamma-corrected digital signal in the manuscript image to output an enhanced digital signal;

a binary coder to input the enhanced digital signal from the density enhancer for comparing density represented by the enhanced digital signal with a predetermined threshold value to encode the enhanced digital signal into a binary code showing either a black or white color when the density of the enhanced digital signal is either larger or smaller than the predetermined threshold value to output binary coded data;

a manuscript driver for conveying the manuscript along the moving path;

a size detector for inputting initial density information of a surface color of a white plate mounted near the moving path, which is read by the optical image read device before the manuscript passes through an image read line, in an initial operation after a start of an image read operation of the manuscript and is output from the gamma corrector in the form of the first gamma-corrected digital signal; storing the initial density information in an internal register; inputting the binary coded data which are obtained by reading a shading line of the front end of the manuscript on the white plate by the optical image read device in the image read operation after the initial operation and are output from the binary coder; counting a number of black pixels in a lengthways direction of the shading line represented by the binary coded data; calculating a width size of the front end of the manuscript from a counted value of the counter; starting a counting using the internal counter; continuously comparing density information of the image of the manuscript, which is output from the gamma corrector in the image read operation, with the initial density information stored in the internal register every predetermined time; stopping the counting of the internal counter when both pieces of the density information are coincident with each other; and calculating a length from the front end to the rear end of the manuscript from a counted value of the counter to output length size data of the manuscript; and a controller for outputting a manuscript conveyance control signal to the manuscript driver and the optical image read device to control the manuscript driver so that the manuscript conveyance is carried out after the initial operation.

4. An image reader comprising:

an optical image read device fixed in a predetermined position on a moving path of a manuscript for reading image data of the manuscript moving at a predetermined speed to output an analog signal;

an analog-digital converter for converting the analog signal input from the optical image read device into a digital signal;

a shading corrector for electronically correcting dispersion of luminous intensity distribution caused by the optical image read device, the dispersion of the luminous intensity distribution being contained in the digital signal, to output a corrected digital signal;

a gamma corrector for carrying out a density correction of the corrected digital signal depending on input pixel density by a gamma treatment to output first and second gamma-corrected digital signals;

a density enhancer for carrying out a density correction of the second gamma-corrected digital signal on the basis of surrounding density around a point of density exhibited by the second gamma-corrected digital signal in the manuscript image to output an enhanced digital signal;

a binary coder to input the enhanced digital signal from the density enhancer for comparing density represented by the enhanced digital signal with a predetermined threshold value to encode the enhanced digital signal into a binary code showing either a black or white color when the density of the enhanced digital signal is either larger or smaller than the predetermined threshold value to output binary coded data;

a manuscript driver for conveying the manuscript along the moving path;

a front end detector for inputting the binary coded data which are obtained by reading a shading line of the front end of the manuscript on the white plate by the optical image read device in an image read operation after an initial operation and are output from the binary coder; counting a number of black pixels in a lengthways direction of the shading line represented by the binary coded data; calculating a width size of the front end of the manuscript from a counted value of the counter to output width size data of the manuscript; and outputting a front end detection signal for representing that the front end of the manuscript passes through an image read line at a predetermined moving speed after the initial operation;

a rear end detector for inputting initial density information of a surface color of a white plate mounted near the moving path, which is read by the optical image read device before the manuscript passes through the image read line, in the initial operation after a start of the image read operation of the manuscript and is output from the gamma corrector in the form of the first gamma-corrected digital signal; storing the initial density information in an internal register; inputting the front end detection signal from the front end detector after the initial operation; starting a counting using the internal counter; continuously comparing density information of the image of the manuscript, which is output from the gamma corrector in the image read operation, with the initial density information stored in the internal register every predetermined time; stopping the counting of the internal counter when both pieces of the density information are coincident with each other; and calculating a length from the front end to the rear end of the manuscript from a counted value of the counter to output length size data of the manuscript; and a controller for outputting a manuscript conveyance control signal to the manuscript driver and the optical image read device to control the manuscript driver so that the manuscript conveyance is carried out after the initial operation.

* * * * *